United States Patent [19]

Kudoh et al.

[11] Patent Number: 5,117,332
[45] Date of Patent: May 26, 1992

[54] SOLID ELECTROLYTIC CAPACITORS AND METHOD FOR MANUFACTURING THE SAME

[75] Inventors: Yasuo Kudoh, Yokohama; Sohji Tsuchiya, Kanagawa; Masao Fukuyama, Kawasaki; Toshikuni Kojima, Zama; Junji Ozaki, Kyoto; Yasuhiro Kobatake, Nara, all of Japan

[73] Assignee: Matsushita Electric Industrial Co., Ltd., Japan

[21] Appl. No.: 705,980

[22] Filed: May 28, 1991

[30] Foreign Application Priority Data

May 25, 1990 [JP] Japan .................. 2-135917
Jun. 18, 1990 [JP] Japan .................. 2-159020

[51] Int. Cl.$^5$ .......... H01G 9/00; C25D 9/02; B01J 17/00
[52] U.S. Cl. .................. 361/525; 29/25.03; 205/188
[58] Field of Search ........... 29/25.03; 361/523–527; 204/56.1

[56] References Cited

U.S. PATENT DOCUMENTS 4,864,472  9/1989  Yoshimura et al. .......... 361/525
4,929,316  5/1990  Harakawa et al. .......... 205/188
4,959,753  9/1990  Kudoh et al. .......... 29/25.03 X

FOREIGN PATENT DOCUMENTS 56-10777   3/1981  Japan .
58-17609   2/1983  Japan .
60-37114   2/1985  Japan .
60-244017 12/1985  Japan .

*Primary Examiner*—Donald A. Griffin
*Attorney, Agent, or Firm*—Lowe, Price, LeBlanc & Becker

[57] ABSTRACT

A method for manufacturing a solid electrolytic capacitor is described. The method comprises providing a valve metal member which has a dielectric film and an inorganic conductive layer formed on opposite sides of the valve metal member in this order, immersing the valve metal member in an electrolytic polymerization solution, and applying an electric potential sufficient to cause electrolytic polymerization between a first polymerization electrode which is provided on said at least one side of said valve metal member through an electric insulating member and a second polymerization electrode kept away from said first polymerization electrode. Further, the valve metal member may be separated into two regions with an insulating separation layer. One region is a capacitor region and the other is an anode terminal region. The anode terminal region is enfolded or convolutely wound to improve the volumetric efficiency. Solid electrolytic capacitors manufactured by the methods are also described.

24 Claims, 3 Drawing Sheets

SOLID ELECTROLYTIC CAPACITORS AND METHOD FOR MANUFACTURING THE SAME

BACKGROUND OF THE INVENTION

1. Field of the Invention

This invention relates to solid electrolytic capacitors having good capacitor characteristics, particularly good high frequency characteristics and high reliability under high temperature and high humidity conditions. The invention also relates to a method for manufacturing such capacitors.

2. Description of the Prior Art

In recent years, digitalization in the electric and electronic fields has been conspicuous. This entails a strong demand of capacitors which exhibit a low impedance in a high frequency range and are small in size and large in capacitance.

Known capacitors which are used in high frequency ranges include, for example, plastic film capacitors, mica capacitors, layer-built ceramic capacitors and the like. These capacitors are disadvantageously so large in size that difficulties are involved in obtaining a large capacitance.

On the other hand, a certain type of capacitor is known as having a large capacitance. Such a capacitor includes, for example, an aluminium dry electrolytic capacitor and an aluminium or tantalum solid electrolytic capacitor. These electrolytic capacitors are advantageous in that since an anodized film serving as a dielectric layer can be formed very thinly, a large capacitance can be realized. However, the anodized film is liable to damage, so that it becomes necessary to provide an electrolyte between the anodized film and a cathode in order to repair the defects. With aluminium dry electrolytic capacitors, anode and cathode aluminium foils which have been etched, respectively, are convolutely wound through a separator and a liquid electrolyte is impregnated in the separator. This presents the problems that since the liquid electrolyte is ion conductive in nature with a large specific resistance, so that the loss (tan $\delta$) is great with very poor frequency and temperature characteristics and that occurrence of the leakage and evaporation of the liquid electrolyte is inevitable, leading to a decrease of the capacitance and an increase of the loss with time. With the tantalum solid electrolytic capacitor, manganese dioxide is used as the electrolyte, the problems on the temperature characteristic and the changes of the capacitance and loss in relation to the time can be overcome. However, the relatively high specific resistance of manganese dioxide results in a frequency characteristic poorer than those of the layer-built ceramic capacitor and film capacitor.

In order to solve the above problems, there has now been proposed use of organic semiconductors having good anodizability such as 7,7,8,8-tetracyanoquinodimethane complexes (hereinafter referred to simply as TCNQ complex or complexes). As set forth in Japanese Patent No. 56-10777 and Japanese Kokai No. 58-17609, the aluminium solid electrolytic capacitor using the TCNQ complex is remarkably improved in the frequency and temperature characteristics with a low leakage current characteristic being achieved. Since the TCNQ complex is thermally stable among organic conductive materials, the life of the capacitor at high temperatures is significantly superior to those of known dry electrolytic capacitors.

Further, there have been recently proposed solid electrolytic capacitors wherein highly conductive polymers, which contain an anion of a support electrolyte as a dopant and which are obtained by electrolytically polymerizing heterocyclic monomers such as pyrrole, thiophene and the like, are formed on an anode for use as an electrolyte (Japanese Kokai Patent Application Nos. 60-37114 and 60-244017).

According to the electrolytic polymerization, a conductive polymer film may be formed on an anode by electrolytic oxidation, but the formation of the conductive polymer on an anode having a dielectric oxide film by the electrolytic polymerization is difficult without breakage of the dielectric film. Even if the electrolytic polymerization will be performed while partially breaking the dielectric oxide film, the growing rate of the polymer will become be so slow that it takes a long time before coverage of the entire surface with the polymer film. If the polymer film formed by the electrolytic polymerization is grown from a broken portion of the dielectric oxide film on an anode whose surface area is increased such as by etching, the growth does not reach the inside of etch pits. This makes it difficult to obtain a capacitor which has a large capacitance.

The valve metal which is not subjected to formation of a dielectric film may be covered directly with the polymer formed by the electrolytic polymerization. After the covering, the dielectric oxide film may be formed through anodization. In this case, however, the anodization reaction has to be carried out through the electrolytically polymerized film. This will cause the polymerized film to be degraded or the adhesion to the valve metal surface to be lower. Thus, the resultant capacitor will not have good characteristics.

To avoid this, several attempts have been made. In one such attempt, an electrode for the polymerization is contacted from outside with a valve metal on which a dielectric oxide film has been formed, thereby forming an electrolytically polymerized film. In this case, the dielectric oxide film is liable to be damaged by the contact with the polymerization electrode, with the attendant problem that a leakage current characteristic and a breakdown voltage are lowered. Where the polymerization electrode is provided at a small distance from the valve metal, the conductive film starts to grow from the polymerization electrode and contacts with the valve metal, permitting the film to be formed over the valve metal surface. This is disadvantageous in that after completion of the electrolytic polymerization, the polymerization electrode has to be removed, whereupon part of the polymerized film is inevitably separated from the valve metal. The separation eventually leads to an increase of the leakage current and a lowering of the breakdown voltage.

In another attempt, a conductive layer is formed on a valve metal surface having an oxide film, with which a polymerization electrode is contacted from outside, thereby forming an electrolytically polymerized film through the conductive layer. Manganese oxide is usually used as the conductive layer for contact with the electrode since it has the repairing ability of the oxide film on the valve metal. When a capacitor is fabricated using a valve metal in the form of a sheet or foil, it is necessary to separately produce a capacitor region covered with an electrolyte and an anode terminal. The capacitor region covered with the electrolyte should be clearly separated from the other region so as to prevent a short-circuiting or leakage current failure. However, when the sheet or foil is immersed in a polymerization solution containing a monomer and a support electrolyte and subjected to electrolytic polymerization, the boundary between the conductive polymer film and the film-free region becomes unclear owing to vibrations occurring in the surface of the solution, the formation of meniscus and the capillary action of the solution. Accordingly, there is the likelihood of short-circuiting being produced or a leakage current failure. To avoid this, a relatively large distance between the anode terminal and the capacitor region has to be provided, thus leading to a difficulty in enhancing a volumetric efficiency.

In addition, when a capacitor element which has a convolutely wound structure of an anode and a cathode through a separator like dry aluminium electrolytic capacitors is fabricated by the electrolytic polymerization technique, satisfactory diffusion of a monomer and ions of a support electrolyte is not possible with the difficulty in uniform formation of the conductive polymer film throughout the capacitor region. In general, the conductive polymer film obtained by the electrolytic polymerization is rigid and is difficult to mechanically process such as bending after the formation of the film. Accordingly, the capacitor region has to be used in the form of a flat sheet or in the form of a convolutely wound structure which has a relatively large curvature.

SUMMARY OF THE INVENTION

It is therefore an object of the invention to provide a method for manufacturing a solid electrolytic capacitor wherein the capacitor suffers little damage of a dielectric oxide film formed on a valve metal and exhibits good leakage current and breakdown voltage characteristics.

It is another object of the invention to provide a method for manufacturing a solid electrolytic capacitor wherein an electrolytically polymerized film is readily formed at a high coverage rate and the capacitor exhibits good capacitance and loss.

It is a further object of the invention to provide a method for manufacturing a solid electrolytic capacitor having a structure wherein an anode terminal is bent or convolutely wound and is separated through an electric insulating material from a capacitor region of a valve metal sheet or foil whereby short-circuiting can be appropriately prevented with an improved leakage current characteristic, and the resultant capacitor can be made small in size and has an improved volumetric efficiency.

It is a still further object of the invention to provide a solid electrolytic capacitor obtained by the above methods wherein a valve metal foil or sheet is used and separated through an electric insulating layer on opposite sides thereof into two regions including an anode terminal region and a capacitor element region.

According to one embodiment of the invention, there is provided a method for manufacturing a solid electrolytic capacitor which comprises: providing a valve metal member which has a dielectric film and an inorganic conductive layer formed on opposite sides of the valve metal member in this order, immersing the valve metal member in an electrolytic polymerization solution, and applying a potential sufficient to cause electrolytic polymerization between a first polymerization electrode which is provided on the at least one side of the valve metal member through an electric insulating member and a second polymerization electrode kept away from said first polymerization electrode whereby an electrolytically polymerized film is formed on the immersed portion of said valve metal. Preferably, the electric insulating member is provided on part of the at least one side of the valve metal and the electrolytic polymerization is performed by providing the first polymerization electrode in contact with or at a distance, which is sufficient for the electrolytic polymerization, from the insulating member. The electrolytically polymerized film serves as a solid electrolyte. The electrolytic polymerization solution contains a electrolytically polymerizable monomer and a support electrolyte in a solvent. The monomer is, for example, pyrrole, thiophene or derivatives thereof.

According to another embodiment of the invention, there is also provided a method for manufacturing a solid electrolytic capacitor which comprises providing a valve metal member having a dielectric film thereon, separating the valve metal member into a first region and a second region on opposite sides of the valve metal member by means of an insulating separation layer, forming a conductive polymer film on one of the regions to provide a capacitor region, and enfolding the other region which serves as an anode terminal. The other region may be convolutely wound, so that the volumetric efficiency of the capacitor can be significantly improved. The conductive polymer film is preferably formed by electrolytic polymerization of a polymerizable heterocyclic compound such as pyrrole, thiophene or a derivative thereof. In this case, the polymer film is formed by forming an inorganic conductive layer on the dielectric film and an electric insulating film on part of the inorganic conductive layer, and applying a polymerization potential to a first electrode in contact with or at a distance from the insulating film formed on the first region and a second polymerization electrode kept away from the first electrode as in the first embodiment. Alternatively, the polymerized film may be formed by direct contact of the first electrode with the inorganic conductive layer.

In accordance with a further embodiment of the invention, the solid electrolytic capacitor manufactured according to the method of the above embodiment is also provided. More particularly, the electrolytic capacitor comprises a valve metal member having an electric insulating separation layer for separation of the valve metal member into two regions on opposite sides of the valve metal member, a dielectric film formed on at least one of the regions, and an electrolytically polymerized film formed on the dielectric film on one region to form a capacitor portion, the other region being enfolded or convolutely wound to reduce a volumetric size.

Preferably, the other region is convolutely wound about a lead wire so that a volumetric efficiency of the capacitor is significantly improved.

DETAILED DESCRIPTION AND EMBODIMENTS OF THE INVENTION

Figure 1:
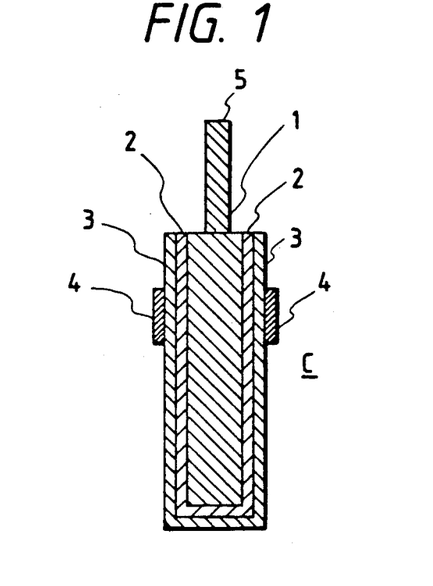
FIG. 1 is a schematic sectional view of a solid electrolytic capacitor unit prior to formation of an electrolytically polymerized film used in one embodiment of the invention.
Figure 2:
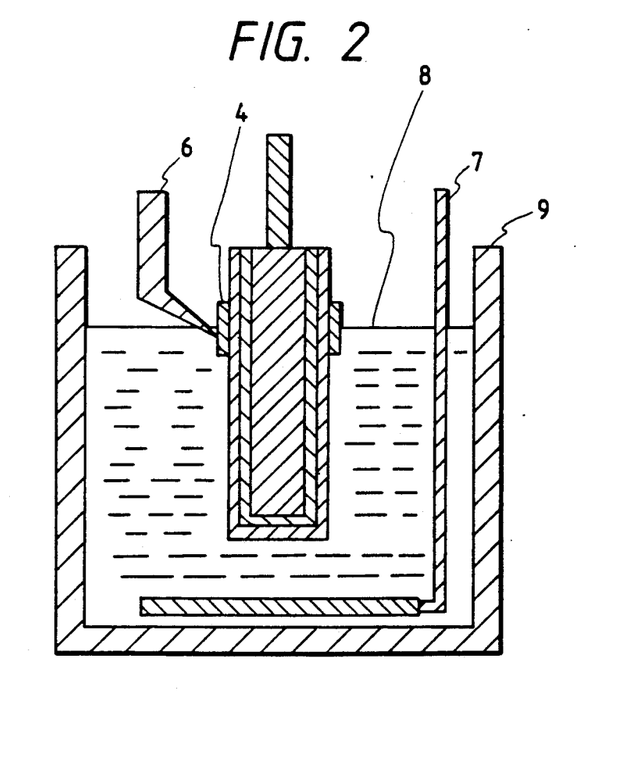
FIG. 2 is a schematic view illustrating a manufacturing method of a solid electrolytic capacitor according to the embodiment illustrated in FIG. 2.

Reference is now made to the accompanying drawings and particularly to FIGS. 1 and 2 wherein a manufacturing method of a solid electrolytic capacitor according to one embodiment of the invention is illustrated.

In FIG. 1, there is shown a capacitor unit C prior to formation of a conductive polymer film. The unit C includes a valve metal member 1 having a dielectric film 2 and an inorganic conductive film 3 formed over the entire surface of the valve metal 1. In this embodiment, the unit C is initially provided. Then, an insulating film or piece 4 is attached to the conductive film 3 on part of at least one side of the valve metal 1. The valve metal is used in the form of a foil or a sheet as usual. Preferably, the foil or sheet is etched in order to increase the surface area of the foil or sheet. The valve metal may be tantalum or aluminium. The dielectric film is formed by anodization as is well known in the art. The inorganic conductive film 3 is made, for example, of manganese dioxide ($MnO_2$) obtained by thermal decomposition of manganese salts such as manganese nitrate. The formation of the dielectric film 2 and the inorganic conductive layer 3 will be more particularly described hereinafter. The reference numeral 5 shown in FIG. 1 indicates an anode lead.

The insulating film 4 is made, for example, of polymers or inorganic materials. Any polymer or inorganic material which is electrically insulating in nature may be used in the practice of the invention. Examples of the polymer include polyimides, polyesters, polyphenylenesulfides, polyamides and the like. Examples of the inorganic material include glass, mica and the like. Preferably, a polyimide film which is heat resistant is used. The insulating film or piece 4 may be merely adhered to the inorganic conductive film 3. Alternatively, the film 4 may be attached to a polymerization electrode.

The valve metal 1 on which the dielectric film 2, the conductive layer 3 and the insulating film 4 have been formed and attached is immersed in an electrolytic polymerization solution 8 contained in a vessel 9 as shown in FIG. 2. The solution 8 should contain a polymerizable monomer and a support electrolyte.

Examples of such monomers include pyrrole or its derivatives having a substituent at the 3 and/or 4 position thereof, a dimer of pyrrole or bipyrrole, thiophene or its derivatives having a substituent at the 3 and/or 4 position thereof, a dimer of thiophene or bithiophene, or a trimer of thiophene or terthienyl, and the like. Examples of the substituent for both pyrrole and thiophene derivatives include a lower alkyl group such as methyl, a lower alkoxy group such as methoxy, ethoxy or the like, an aryl group such as phenyl, and the like.

The support electrolytes include, for example, inorganic compounds of anions such as $ClO_4^-$, $BF_4^-$ or $PF_5^-$ and cations of ammonium, an alkali metal or the like, organic compounds such as aliphatic acids including formic acid, oxalic acid and the like and salts thereof, aromatic carboxylic acids and salts such as salicylic acid, benzoic acid and their salts, organic sulfonic acids such as toluenesulfonic acid, naphthalene sulfonic acid and their salts as is known in the art.

Thereafter, a potential sufficient to cause the electrolytic polymerization is applied between a first polymerization electrode 6 and a second polymerization electrode 7 kept away from the first electrode 6 as shown in FIG. 2. As a result, an electrolytically polymerized film is formed on the immersed portion of the valve metal on which the dielectric oxide film 2 and the conductive layer 3 have been formed in this order. Preferably, the capacitor element C is immersed in the solution 8 to a level of the insulating film 4 as shown in FIG. 2. The first polymerization electrode 6 should preferably be provided in contact with the insulating film 4 or at a distance from the insulating film 4 which allows growth of an electrolytically polymerized film over the conductive film 3. This is because the polymerized film grows from the first electrode 2, so that the first polymerization electrode 6 provided at an appropriate distance from the insulating film 4 shows a similar effect as in the direct contact of the first electrode with respect to the formation of the polymerized film.

Fabrication of the solid electrolytic capacitor C according to this embodiment is described in more detail.

As shown in FIG. 1, the valve metal foil or sheet 1 having an anode lead 2 for the capacitor is first provided. This foil 1 is subjected to etching by any known procedures to increase the surface area. The etched foil is subsequently anodized by immersion in an aqueous acid solution to form the dielectric oxide film 2 on the surface of the foil 1. The anodization is effected by an ordinary electrochemical procedure. The acid used for this purpose may be an inorganic acid such as phosphoric acid or an organic acid such as oxalic acid, adipic acid or the like. If the valve metal is aluminium, $Al_2O_3$ is formed on the foil surface. Alternatively, if tantalum is used, $Ta_2O_5$ is formed as the oxide film 2. The foil 1 on which the anodized film 2 has been formed is immersed in an aqueous solution of, for example, a water-soluble manganese compound for a given time and dried in air at 200° to 400° C. thereby thermally decomposing the nitrate into manganese dioxide to form a manganese dioxide layer 3 on the anodized film 2. Examples of the water-soluble manganese compound include manganese nitrate, and salts of manganese and acetyl acetone, oleic acid, naphthenic acid and the like. Of these, manganese nitrate is preferred because of its availability.

A conductive polymer film is then formed on the inorganic conductive layer 3. For this purpose, the insulating film 4 is preferably attached to a part of the inorganic conductive layer 3. The insulating film-bearing valve metal member 1 is immersed in the electrolytic polymerization solution 8 in the vessel 9. In the vessel 9, the second or counter electrode 7 is provided as kept away from the first electrode 6 as shown in FIG. 2. The vessel 9 accommodates therein an electrolytic polymerization solution 8 consisting of an electrolytically polymerizable monomer and a support electrolyte as set forth above. In this arrangement, when a potential which is higher than a potential for polymerization is applied between the electrode 6 and the counter electrode 7, a polymer film is first formed on the electrode 6, from which the conductive polymer film gradually grows toward the manganese dioxide film. It will be noted that if the electric insulating film is provided on opposite sides or a plurality of portions of the valve metal member as shown in FIG. 1 and a corresponding number of the first polymerization electrodes are provided, the electrolytic polymerization is facilitated and full coverage of the inorganic conductive layer within a shorter time is realized.

The electrolytic polymerization solution 11 consists of an electrolytically polymerizable monomer and a support electrolyte as discussed before. The monomer and electrolyte are usually dissolved in an organic solvent in amounts of 0.1 to 1 moles/liter and from 0.01 to 0.5 moles/liter, respectively. The solvent may be any inert compounds capable of dissolving both the monomer and electrolyte. Examples of such solvents include water and non-aqueous polar solvents such as acetonitrile, propylene carbonate, γ-butyrolactone, dimethylformamide and the like.

After the polymer film has fully covered the surface of the manganese dioxide film 3 immersed in the solution, the polymerization reaction is stopped, followed by washing the polymer film on the surface thereof to remove an unreacted monomer, the electrolyte and unstable oligomers. For the washing, a solvent which is easy to dry is used including, for example, water, alcohols, acetonitrile, ketones or the like.

A cathode lead (not shown) for the capacitor is attached to the conductive polymer film by means of a carbon paste or silver paste. The resultant capacitor element C may be covered with a resin such as an epoxy resin. Finally, the covered element is aged, for example, by application of a potential of 20 volts at a normal temperature for several hours.

According to the method of the invention, when the first polymerization electrode is removed after completion of the electrolytic polymerization, the partial separation of the film from the valve metal surface can be prevented by which a short/circuiting failure or an increase of leakage current can be avoided. Further, when the insulating film is made of a relatively soft or flexible polymer, the dielectric oxide film and the inorganic conductive layer are prevented from direct contact with the hard polymerization electrode. This will prevent damages of the dielectric film, so that the resultant solid electrolytic capacitor has a small leakage current and a high breakdown voltage. This is based on the finding that the electrolytically polymerized film can be relatively readily formed on a relatively smooth surface of the insulating film. If the insulating film is attached in a small region, the electrolytic polymerization can be completed to form an electrolytically polymerized film substantially within the same time as in the case where no insulating film is provided.

Moreover, if the insulating film is provided in such a way that the valve metal member having a dielectric oxide film and an inorganic conductive layer is separated into two regions by means of the insulating film as in an embodiment described hereinafter and only one region is immersed in an electrolytic polymerization solution, the solution will not move toward the other region by the capillary action. This movement will be appropriately inhibited especially when the valve metal member is etched so as to increase the surface area. This results in the clear boundary between one region where the electrolytically polymerized film has been formed and the other region which is free of the formation. This also serves to avoid the short-circuiting failure or to make a small leakage current.

As described before, the materials for the insulating film are preferably polymers because of their effect of preventing damages on the dielectric film. Among polymers, polycondensates are preferred, of which polyimides are more preferred because of their high heat resistance. The electric insulating film may be provided between the first electrode and the inorganic conductive layer. For instance, the insulating film may be attached to the inorganic conductive layer surface or to the surface of the first electrode.

Since the inorganic conductive layer is formed on the dielectric oxide film, the electrolytic polymerization readily proceeds along the surface of the inorganic conductive layer. If the valve metal is etched, the electrolytically polymerized film can be formed in the inside of the etch pits, ensuring a high capacitance.

It will be noted that the first electrode is not critical with respect to the shape and is preferably etched.

Another embodiment of the invention is described.

Figure 3:
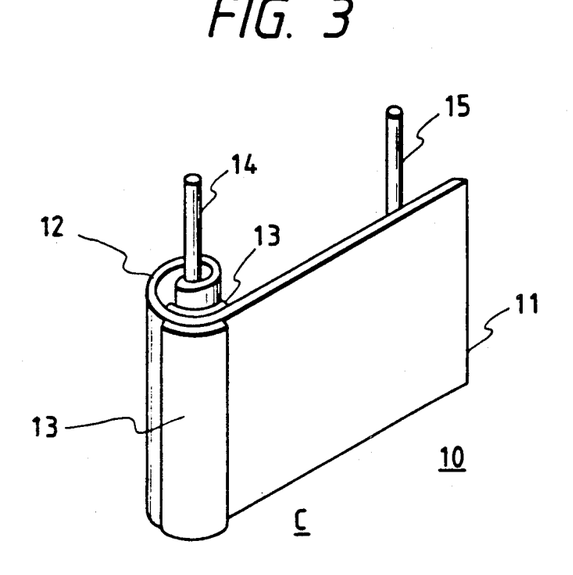
FIG. 3 is an illustrative view of a solid electrolytic capacitor obtained by a method according to another embodiment of the invention.

In FIG. 3, there is shown a solid electrolytic capacitor C which includes a valve metal member 10 in the form of a foil or sheet having a capacitor portion 11 and an anode terminal portion 12 enfolded or convolutely wound as shown. The capacitor portion 11 and the terminal portion 12 are separated with an insulating separation layer 13 at opposite sides of the member 10. The capacitor portion 11 and the anode terminal portion 12 are clearly separated from each other with the insulating separation layer 13. The anode terminal portion 12 is enfolded as desired to reduce the size thereof and has an anode lead 14. A cathode lead 15 is provided in contact with the capacitor portion 11. The capacitor portion is made of the valve metal member 10 having a dielectric oxide film and an inorganic conductive layer on which a conductive polymer layer is formed as will be described hereinafter.

In this embodiment, it is the most important that since the valve metal member is clearly separated into the anode terminal portion 12 and the capacitor portion 11, the terminal portion 12 can be processed to reduce the size such as by enfolding or convolute winding. Accordingly, the capacitor element is made small in size and is improved in volumetric efficiency.

The fabrication method of the solid electrolytic capacitor set forth above is described.

Figure 4A:
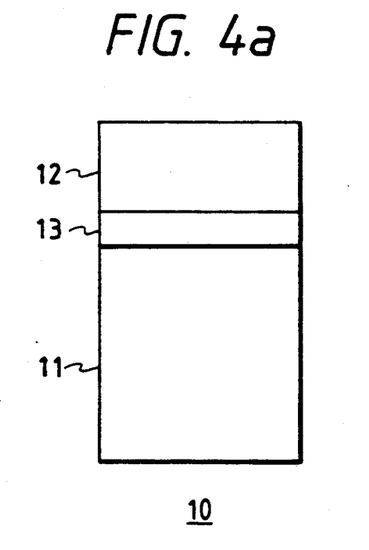
FIGS. 4(a) and 4(b) are, respectively, schematic views illustrating a valve metal member having two separated portions prior to electrolytic polymerization according to the embodiment illustrated in FIG. 3.
Figure 4B:
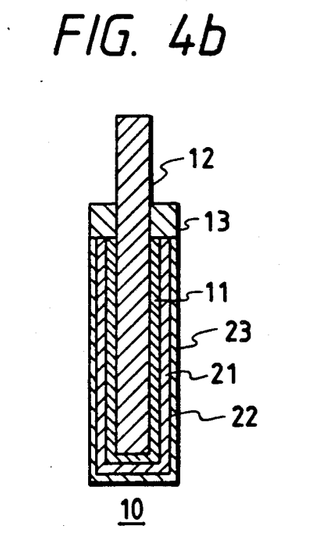

Initially, there is provided a valve metal member 10 which is in the form of a foil or sheet. The member 10 is separated with the insulating separation layer 13 into a region 11 serving as the capacitor portion and a region 12 serving as the anode terminal portion on opposite sides of the member 10 as shown in FIG. 4a. The region 11 is formed on the surfaces thereof with a dielectric oxide film 21 and an inorganic conductive layer 22 as shown in FIG. 4b in a manner as described in the first embodiment of the invention.

Thereafter, a conductive polymer layer 23 is formed on the inorganic conductive layer 22. This is particularly described in FIG. 5. In the figure, the capacitor portion 11 is immersed in an electrolytic solution 27 in a vessel 28. A potential sufficient for the electrolytic polymerization is applied between a first electrode 25 and a counter electrode 26 to form the electrolytically polymerized film 23. The electrolytic solution 27 may be one which is described with respect to the first embodiment. In this case, the first electrode 25 is directly contacted with the inorganic conductive layer 22. Preferably, an electric insulating film or piece is provided between the first polymerization electrode 25 and the inorganic conductive layer 23 as in the case of the first embodiment. The electrolytically polymerizable monomers and conditions are those described in the first embodiment.

Figure 5:
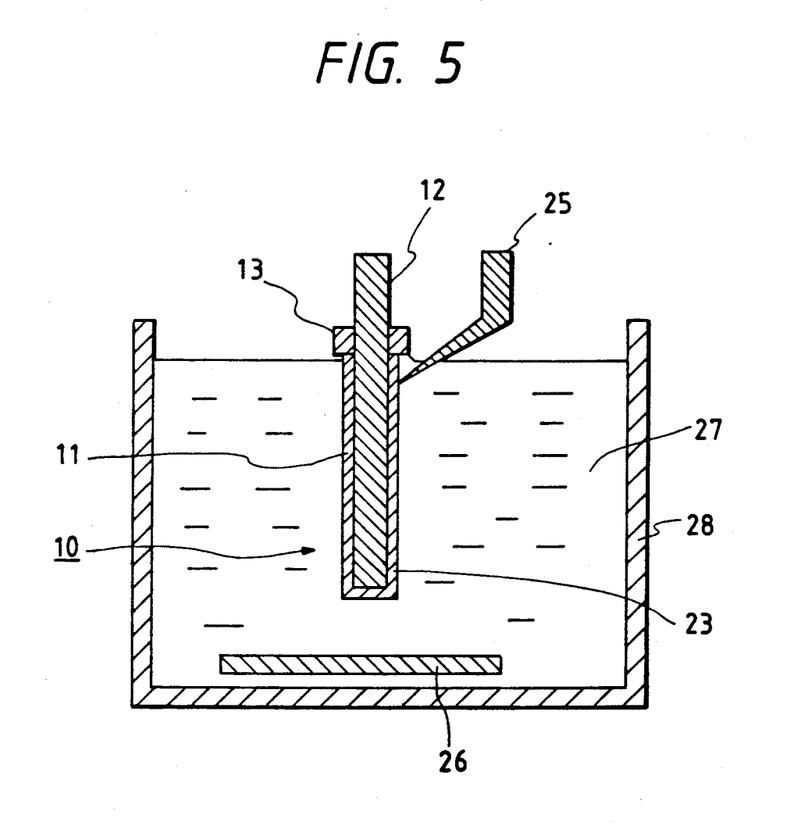
FIG. 5 is a schematic view illustrating a manufacturing method of solid electrolytic capacitor according to the embodiment illustrated in FIG. 3.

Aside from the above procedure, the conductive polymer layer 23 may be formed by oxidation polymerization of the afore-indicated monomers as is known in the art.

After the formation of the electrolytically polymerized or conductive polymer film 23, the region 12 is enfolded or convolutely wound. In this connection, the insulating separation layer 13 may be enfolded or convolutely wound along with the region 12. Preferably, the region 12 should be wound about the anode lead 14 to reduce the size to an extent as small as possible.

Since the dielectric oxide film 21 may be readily removed and the anode lead 14 can then be attached to the region 12, the dielectric oxide film 21 may be formed over the entire surfaces of the valve metal member 10 prior to formation or attachment of the insulating layer 13.

The insulating separation layer 13 should be made of electric insulating materials and can stand use when mechanically deformed by winding or enfolding. Such materials include various polymers such as polyimides used in the first embodiment. Asides, silicone rubbers may also be used.

The capacitor obtained according to the above embodiment is clearly separated into the capacitor portion and the anode terminal portion, so that a short-circuiting failure and a leakage current failure can be appropriately prevented. In addition, the anode terminal portion is reduced in size with an improved volumetric efficiency. As a matter of course, the anode terminal portion may be enfolded or convolutely wound without use of any anode lead, after which an anode lead may be attached to the enfolded or wound portion.

When the insulating separation layer 13 is made of a flexible material, it is possible to enfold or wind the terminal portion along with the insulating layer 13. This is favorable from the standpoint of the improvement in the volumetric efficiency. The insulating layer 13 may be formed by adhering a polymer film to the inorganic conductive layer 22. Alternatively, a polymer or prepolymer solution is applied to the inorganic conductive layer 22 in position and dried. If the prepolymer is used, a curing reaction may be effected in situ.

The present invention is more particularly described by way of examples.

EXAMPLE 1

A 8 mm wide ×10 mm long aluminium etched foil was provided as a valve metal foil and was attached with an anode lead as shown in FIG. 1. This foil was placed in a 3% ammonium adipate aqueous solution and anodized at about 70° C. by application of a potential of 35 volts to form a dielectric film thereon. Thereafter, the anodized aluminium film was immersed in a 30% manganese nitrate aqueous solution and heated at 250° C. for 10 minutes to form a thermally decomposed manganese oxide conductive layer to provide an anode. The anode foil was then attached with a about 25 μm thick polyimide film (Kapton) with a width of 2 mm on opposite sides of the foil.

Thereafter, the thus attached foil was immersed in an electrolytic polymerization solution consisting of 0.3 moles of pyrrole, 0.15 moles of sodium p-toluenesulfonate and water as shown in FIG. 2 and a first electrolytic polymerization electrode made of stainless steel was contacted with the polyimide film. A potential of 3 volts was applied between the first electrode and a second electrode provided at a distance from the first electrode to form an electrolytically polymerized film of polypyrrole doped with the p-toluenesulfonate anions.

The first electrode was removed and the polymerized film was washed with water and dried. Thereafter, a carbon paste and a silver paste were, respectively, applied onto the polymerized film, to which a cathode lead was attached, thereby completing a capacitor element.

Ten capacitor elements were similarly fabricated and each element was encased in an epoxy resin casing.

The respective capacitors were aged at 13 volts and subjected to measurements of a capacitance at 120 Hz, a loss at 120 Hz, a leakage current and breakdown voltage. These values are, respectively, indicated as an average of the ten measurements in Table 1 appearing hereinafter.

COMPARATIVE EXAMPLE 1

The general procedure of Example 1 was repeated except that the manganese oxide layer was not formed and the first polymerization electrode was directly contacted with the anode foil without attachment of any polyimide film, thereby obtaining 10 capacitors. These capacitors were evaluated in the same manner as in Example 1. The results are shown in Table 1.

The comparison between the results of Example 1 and Comparative Example 1 reveal that the formation of the polymerized film in Comparative Example 1 took a very long time and the capacitance and loss were significantly inferior to those of Example 1. In addition, the leakage current and the breakdown voltage were also poorer in Comparative Example 1. Thus, the formation of the inorganic conductive layer and the provision of the insulating polyimide film between the first electrode and the anode are very effective.

Moreover, the general procedure of Example 1 was repeated except that the manganese oxide layer was not provided, thereby obtaining ten capacitors. The results of the evaluation of these capacitors reveal that the breakdown voltage and the leakage current characteristic are similar to those of Example 1. However, the capacitance and the loss were found to be poor like Comparative Example 1.

In addition, the general procedure of Example 1 was repeated except that the first electrode was contacted directly with the manganese oxide layer without use of any polyimide film, thereby obtaining ten capacitors. The results of the evaluation of these capicators reveal that the capacitance and the loss were similar to those of Example 1. However, the leakage current and breakdown voltage characteristics were poor as in Comparative Example 1.

EXAMPLE 2

The general procedure of Example 1 was repeated except that a quartz glass piece with the same size as the polyimide film was used instead of the polyimide film, thereby obtaining ten capacitors. These capacitors were evaluated in the same manner as in Example 1. The results are shown in Table 1. From the table, it will seen that the capacitance, loss, leakage current and breakdown voltage are superior to those of Comparative Example 1.

EXAMPLE 3

The general procedure of Example 1 was repeated except that a mica piece or film with the same size as the polyimide film was used instead of the polyimide film, thereby obtaining ten capacitors. These capacitors were evaluated in the manner as in Example 1. The results are shown in Table 1. The time required for full coverage with the polymerized film was shortened and the capacitance, loss, leakage current and breakdown voltage are superior to those of Comparative Example 1.

EXAMPLE 4

The general procedure of Example 1 was repeated except that an about 100 μm thick polyester film was used instead of the polyimide film, thereby obtaining ten capacitors. These capacitors were evaluated in the same manner as in Example 1. The results are shown in Table 1. From the table, it will seen that the capacitance, loss, leakage current and breakdown voltage are superior to those of Comparative Example 1.

EXAMPLE 5

The general procedure of Example 1 was repeated except that a 25 μm thick polyphenylene sulfide film was attached instead of the polyimide film, thereby obtaining ten capacitors. These capacitors were evaluated in the same manner as in Example 1. The results are shown in Table 1. From the table, it will seen that the capacitance, loss, leakage current and breakdown voltage are superior to those of Comparative Example 1.

EXAMPLE 6

The general procedure of Example 1 was repeated except that a 25 μm thick polyimide film was attached instead of the polyimide film, thereby obtaining ten capacitors. These capacitors were evaluated in the same manner as in Example 1. The results are shown in Table 1. The time required for full coverage with the polymerized film was shortened and the capacitance, loss, leakage current and breakdown voltage are superior to those of Comparative Example 1.

EXAMPLE 7

The general procedure of Example 1 was repeated except that the first polymerization electrode was not directly contacted with the polyimide film but was kept at a distance of 1, 2 or 3 mm from the polyimide film, thereby obtaining ten capacitors for each distance. These capacitors were evaluated in the same manner as in Example 1. The results are shown in Table 1. It will be seen from the table that the time required for full coverage with the polymerized film tends to be prolonged when the distance between the electrode and the film is increased and that the distance is preferably not longer than 2 mm. In this connection, however, the capacitor characteristics are excellent irrespective of the distance.

EXAMPLE 8

The general procedure of Example 1 was repeated except that there were used, instead of sodium p-toluenesulfonate as a support electrolyte, sodium dodecylsulfate (SDS), n-butyl phosphoric ester (NBP), sodium monobutylnaphthalenesulfonate (SMBNS), and sodium triisopropylnaphthalenesulfonate (STIPNS), thereby obtaining ten capacitors for each electrolyte. These capacitors were evaluated in the same manner as in Example 1. The results are shown in Table 1. The times required for full coverage through the electrolytic polymerization are similar to that of Example 1. The capacitance, loss, leakage current and breakdown voltage of the respective types of capacitors are superior to those of Comparative Example 1.

EXAMPLE 9

The general procedure of Example 1 was repeated except that the pyrrole monomer was replaced by thiophene, sodium p-toluenesulfonate was replaced by tetraethylammonium p-toluenesulfonate, and water was replaced by acetonitrile, thereby obtaining ten capacitors. These capacitors were evaluated in the same manner as in Example 1. The results are shown in Table 1. The time required for full coverage is similar to that of Example 1. The capacitance, loss, leakage current and breakdown voltage of the respective types of capacitors are superior to those of Comparative Example 1.

EXAMPLE 10

The general procedure of Example 1 was repeated except that there was used a tantalum foil which had been embossed and anodized in a 10% phosphoric acid aqueous solution by application of 25 volts at about 30° C., thereby obtaining ten capacitors. The capacitors were evaluated in the same manner as in Example 1. The results are shown in Table 1.

COMPARATIVE EXAMPLE 2

The general procedure of Example 9 was repeated except that the manganese oxide layer was not formed and the anode foil was in direct contact with the first electrode without attachment of the polyimide film, thereby obtaining ten capacitors. The capacitors were evaluated in the same manner as in Example 1. The results are shown in Table 1. It took a very long time for full coverage with a polymerized film. The capacitance and loss were significantly poorer than those of Examples 1 and 9. The leakage current and breakdown voltage were also low.

It will be seen that the provision of insulating polymer films between the polymerization electrode and the anode is very effective.

TABLE 1

|  | Polymerization Time (Hours) | Capacitance (μF) | tan δ (%) | Leakage Current (μm) | Breakdown Voltage (V) | Remarks |
| --- | --- | --- | --- | --- | --- | --- |
| Example 1 | 43 | 14.1 | 2.0 | 0.82 | 22.5 |  |
| Comp. Ex. 1 | 90 | 4.8 | 12.1 | 7.6 | 15.8 |  |
| Example 2 | 45 | 13.7 | 2.4 | 0.79 | 20.4 |  |
| Example 3 | 36 | 13.9 | 2.2 | 0.56 | 23.2 |  |
| Example 4 | 49 | 14.5 | 2.2 | 0.81 | 22.9 |  |
| Example 5 | 47 | 13.5 | 1.9 | 0.47 | 22.1 |  |
| Example 6 | 35 | 14.4 | 1.8 | 0.46 | 21.8 |  |
| Example 7 | 49 | 14.5 | 2.1 | 0.74 | 23.1 | 1 mm |
|  | 56 | 14.9 | 2.5 | 0.91 | 22.2 | 2 mm |

TABLE 1-continued

| | Polymerization Time (Hours) | Capacitance (μF) | tan δ (%) | Leakage Current (μm) | Breakdown Voltage (V) | Remarks |
|---|---|---|---|---|---|---|
| | 87 | 15.2 | 2.4 | 0.85 | 21.8 | 3 mm |
| Example 8 | 40 | 14.3 | 2.3 | 0.77 | 23.6 | SDS |
| | 44 | 15.2 | 1.6 | 0.31 | 25.3 | NBP |
| | 41 | 14.5 | 1.8 | 0.65 | 22.0 | SMBNS |
| | 45 | 13.4 | 2.2 | 0.59 | 23.3 | STIPNS |
| Example 9 | 44 | 12.5 | 2.8 | 0.66 | 23.6 | |
| Example 10 | 25 | 0.87 | 1.2 | 0.092 | 20.7 | |
| Comp. Ex. 2 | 51 | 0.37 | 3.8 | 1.6 | 13.2 | |

In the above examples, the inorganic conductive layer used is a thermally decomposed manganese oxide layer, and other conductive layers may be likewise used.

In the examples, the insulating film is adhered. The insulating film may be formed by sputtering or vacuum evaporation.

EXAMPLE 11

As shown in FIG. 4, an aluminium etched foil with a width of 8 mm, a length of 15 mm and a thickness of 90 μm was applied with a polyimide film (Kapton) adhesive tape. as an insulating separation layer, on opposite sides of the foil in such a way that a capacitor portion had a length of 10 mm separated from the other anode terminal portion. Thereafter, the foil was anodized in a 3% ammonium adipate aqueous solution at about 70° C. by application of 35 volts to form a dielectric oxide film thereon.

Thereafter, the capacitor-forming portion was immersed in a 30% manganese nitrate aqueous solution and heated at 250° C. for 10 minutes to form a thermally decomposed manganese oxide conductive layer to provide an anode. The portion was then immersed in an electrolytic polymerization solution consisting of 0.3 moles of pyrrole, 0.15 moles of sodium p-toluenesulfonate and water as shown in FIG. 5 and a first electrolytic polymerization electrode made of stainless steel was contacted with the capacitor-forming portion. A potential of 3 volts was applied between the first electrode and a second electrode provided at a distance from the first electrode to form an electrolytically polymerized film of polypyrrole doped with the p-toluenesulfonate anions.

The first polymerization electrode was removed and the polymerized film was washed with water and dried. Thereafter, a carbon paint and a silver paint were, respectively, applied onto the polymerized film, to which a cathode lead was attached as shown in FIG. 2. Further, an anode lead with a diameter of 0.5 mm was welded at one end of the anode terminal portion. The anode terminal portion including the insulating adhesive tape was convolutely wound about the anode lead to obtain a capacitor element as shown in FIG. 3.

Ten capacitor elements were similarly fabricated and encased to obtain capacitors.

The respective capacitors were aged at 13 volts and subjected to measurements of a capacitance at 120 Hz, a loss at 120 Hz and a leakage current. These values are, respectively, indicated as an average of the ten measurements in Table 2 appearing hereinafter.

COMPARATIVE EXAMPLE 3

The general procedure of Example 11 was repeated except that the insulating separation film was not provided and the electrolytic polymerization was effected by immersion of the foil to a length of 10 mm in the polymerization solution, thereby obtaining ten capacitors. During the course of the electrolytic polymerization, it was observed that the polymerized film was non-uniformly grown to a region above the immersion level which was considered to ascribe to vibrations of the solution, the formation of the meniscus and capillary action.

After aging at 13 volts, the resulting capacitors were subjected to measurements in the same manner as in Example 11.

The results of Example 11 and Comparative Example 3 are shown in Table 2, from which it will be seen that the capacitor of Example 11 had a very excellent leakage current characteristic and can be reduced in size from a width of 8 mm × a length of 15 mm to a width of 8 mm × a length of 10 mm for the same level of the capacitance. Thus, miniaturization could be realized.

EXAMPLE 12

The general procedure of Example 11 was repeated except that the anode lead was attached at a position of 2 mm from the end of the insulating separation layer, thereby obtaining ten capacitors. The capacitors were evaluated in the same manner as in Example 11. The results are shown in Table 2. The leakage current is apparently superior to that of Comparative Example 3. In addition, the capacitor could be reduced in size.

EXAMPLE 13

The general procedure of Example 11 was repeated except that a silicone RTV rubber composition was applied in a width of 1 mm and cured to form an insulating separation layer instead of the Kapton adhesive tape, thereby obtaining ten capacitors. The capacitors were evaluated in the same manner as in Example 11. The results are shown in Table 2. The leakage current is apparently superior to that of Comparative Example 3. In addition, the capacitor could be reduced in size.

EXAMPLE 14

The general procedure of Example 11 was repeated except that pyrrole was replaced by thiophene, sodium p-toluenesulfonate used as the support electrolyte was replaced by tetraethylammonium p-toluenesulfonate, and water was replaced by acetonitrile, thereby obtaining ten capacitors. The capacitors were evaluate din the same manner as in Example 11. The results are shown in Table 2, revealing that the leakage current characteristic is superior to that of Comparative Example 3. The capacitor can be reduced in size.

EXAMPLE 15

The general procedure of Example 11 was repeated except that there was used a 0.1 mm thick tantalum sheet which had been embossed and anodized in a 10% phosphoric acid aqueous solution by application of 35 volts at about 90° C., thereby obtaining ten capacitors, thereby obtaining ten capacitors. The capacitors were evaluated in the same manner as in Example 11. The results are shown in Table 2. The leakage current characteristic is superior to that of Comparative Example 3 with a reduced size.

EXAMPLE 16

The general procedure of Example 11 was repeated except that the anode lead was attached at a position of 0.5 mm from the end of the insulating separation layer and the portion at which the anode lead has been attached was enfolded, thereby obtaining ten capacitors. The capacitors were evaluated in the same manner as in Example 11. The results are shown in Table 2, revealing similar effects as in the foregoing examples.

TABLE 2

|  | Capacitance ($\mu$F) | tan $\delta$ (%) | Leakage Current ($\mu$m) |
|---|---|---|---|
| Example 11 | 14.2 | 2.4 | 0.34 |
| Comp. Ex. 3 | 14.9 | 2.3 | 8.62 |
| Example 12 | 14.5 | 2.3 | 0.55 |
| Example 13 | 14.3 | 2.4 | 0.18 |
| Example 14 | 14.2 | 2.8 | 0.12 |
| Example 15 | 0.89 | 1.1 | 0.09247 |
| Example 16 | 14.4 | 2.4 | 0.61 |

In Examples 11 to 16, the electrolytic polymerization is used but oxidation polymerization in a liquid phase may be used to form a conductive polymer film. Thus, the manner of polymerization is not critical although the electrolytic polymerization using an insulating film in contact with a first polymerization electrode as set forth in Examples 1 to 10 is preferred. Moreover, the dielectric oxide film was formed prior to formation or attachment of the insulating separation layer but may be formed after the formation of the insulating separation layer.

Moreover, the insulating separation layer had a width of 1 mm but may have any width sufficient to form a clear boundary between the capacitor portion and the other portion.

The insulating separation layer may be formed by attachment of an insulating film or application and curing of an insulating composition as set forth in the examples, but may be formed by other techniques such as a plasma polymerization.

What is claimed is:

1. A method for manufacturing a solid electrolytic capacitor which comprises:
   providing a valve metal member which has a dielectric film and an inorganic conductive layer formed on opposite sides of the valve metal member in this order;
   immersing said valve metal member in an electrolytic polymerization solution; and
   applying an electric potential sufficient to cause electrolytic polymerization between a first polymerization electrode which is provided on said at least one side of said valve metal member through an electric insulating member and a second polymerization electrode kept away from said first polymerization electrode whereby an electrolytically polymerized film is formed on the immersed portion of said valve metal.

2. The method according to claim 1, wherein said inorganic conductive layer is formed by immersing said valve metal member having the dielectric film thereon in an aqueous solution of manganese nitrate and thermally decomposed at a temperature of from 200° to 400° C.

3. The method according to claim 1, wherein said electric insulating member is made of a polymer.

4. The method according to claim 3, wherein said polymer is a polyimide.

5. The method according to claim 1, wherein said electric insulating member is provided on said inorganic conductive layer and said first polymerization electrode is in contact with or at a distance, which is sufficient for electrolytic polymerization, from said electric insulating member.

6. The method according to claim 1, wherein said electrolytic polymerization solution contains an electrolytically polymerizable monomer, a support electrolyte and a solvent therefor.

7. The method according to claim 6, wherein said electrolytically polymerizable monomer is a member selected from the group consisting of pyrrole, thiophene and derivatives thereof.

8. The method according to claim 1, wherein said valve metal member is made of tantalum or aluminium.

9. A solid electrolytic capacitor which comprises a valve metal member having an electric insulating separation layer for separation of said valve metal member into two regions on opposite sides of said valve metal member, a dielectric film formed on at least one of the regions, and a conductive polymer film formed on the dielectric film on one region to form a capacitor portion, the other region being enfolded or convolutely wound to reduce a volumetric size.

10. The solid electrolytic capacitor according to claim 9, wherein said valve metal member is made of tantalum or aluminium.

11. The solid electrolytic capacitor according to claim 9, wherein said electric insulating separation layer is made of a polymer.

12. The solid electrolytic capacitor according to claim 9, wherein said conductive polymer film is derived from pyrrole, thiophene or a derivative thereof.

13. The solid electrolytic capacitor according to claim 9, wherein said conductive polymer film is an electrolytically polymerized film or pyrrole, thiophene or a derivative thereof.

14. A method for manufacturing a solid electrolytic capacitor which comprises;
   providing a valve metal member having a dielectric film thereon;
   separating said valve metal member into a first region and a second region on opposite sides of the valve metal member by means of an insulating separation layer;
   forming a conductive polymer film on one of the regions to provide a capacitor region; and
   enfolding the other region which serves as an anode terminal.

15. The method according to claim 14, wherein said dielectric film is formed prior to the separation of said valve metal member.

16. The method according to claim 14, wherein said dielectric film is formed after the separation of said valve metal member.

17. The method according to claim 14, wherein said conductive polymer film is formed by electrolytic polymerization of a polymerizable heterocylic compound.

18. The method according to claim 17, wherein the electrolytic polymerization is performed by a procedure which comprises forming an inorganic conductive layer on said dielectric film, immersing said valve metal member in an electrolytic polymerization solution, and applying a potential sufficient to cause electrolytic polymerization between a first polymerization electrode which is provided on said at least one side of said valve metal member through an electric insulating member provided on the capacitor region and a second polymerization electrode kept away from said first polymerization electrode whereby an electrolytically polymerized film is formed on said valve metal.

19. The method according to claim 18, wherein said electric insulating member is made of a polymer.

20. The method according to claim 18, wherein said polymer is a polyimide.

21. The method according to claim 18, wherein said electric insulating member is provided on said inorganic conductive layer and said first polymerization electrode is in contact with or at a distance, which is sufficient for electrolytic polymerization, from said electric insulating member.

22. The method according to claim 18, wherein said electrolytic polymerization solution contains an electrolytically polymerizable monomer, a support electrolyte and a solvent therefor.

23. The method according to claim 22, wherein said electrolytically polymerizable monomer is a member selected from the group consisting of pyrrole, thiophene and derivatives thereof.

24. The method according to claim 18, wherein said valve metal member is made of tantalum or aluminium.

* * * * *